Figure 1:
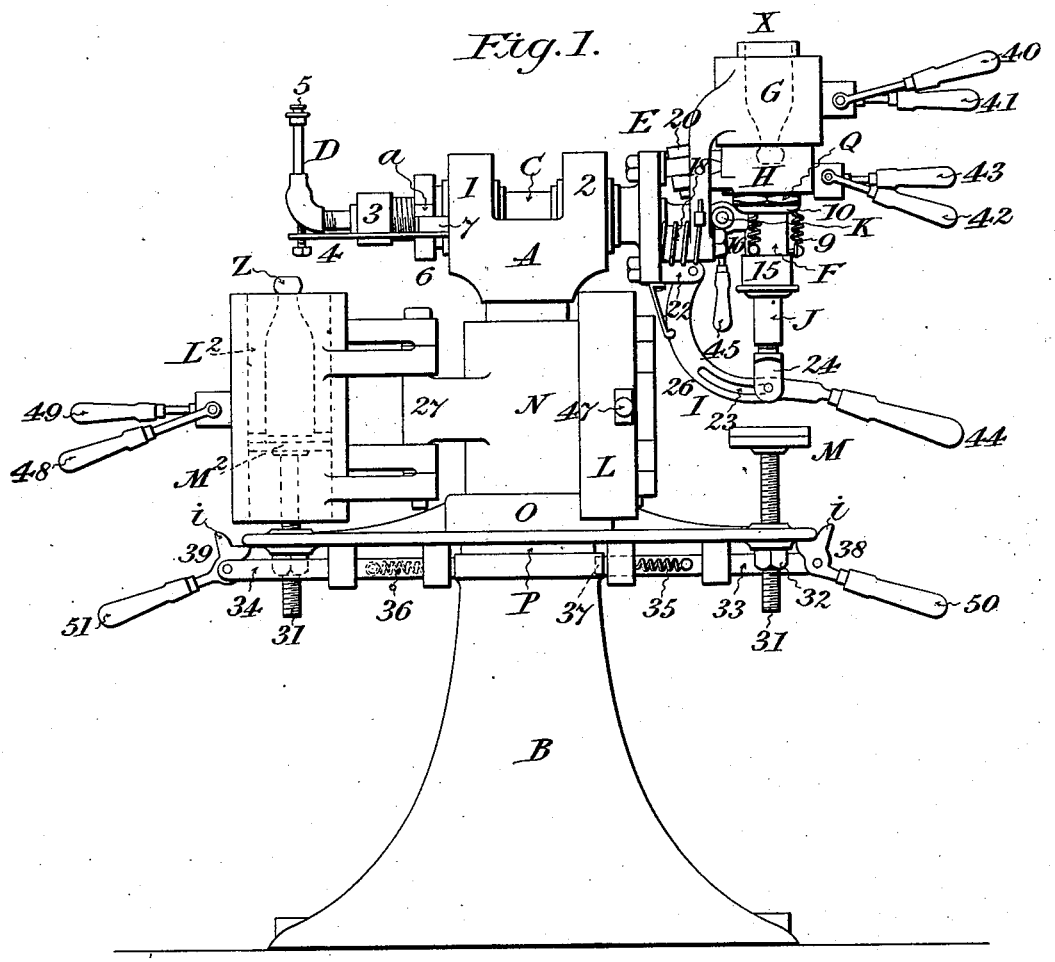

No. 724,388. PATENTED MAR. 31, 1903.
L. GROTE.
MACHINE FOR MAKING GLASS BOTTLES.
APPLICATION FILED JUNE 29, 1901.
NO MODEL. 7 SHEETS—SHEET 1.

No. 724,388. PATENTED MAR. 31, 1903.
L. GROTE.
MACHINE FOR MAKING GLASS BOTTLES.
APPLICATION FILED JUNE 29, 1901.
NO MODEL. 7 SHEETS—SHEET 3.

Witnesses
C. H. Walker
E. Thos. Loftus

Inventor
Ludwig Grote
by ___ Attorney

No. 724,388. PATENTED MAR. 31, 1903.
L. GROTE.
MACHINE FOR MAKING GLASS BOTTLES.
APPLICATION FILED JUNE 29, 1901.
NO MODEL. 7 SHEETS—SHEET 4.

Witnesses
C. H. Walker.
E. Thos. Loftus.

Inventor
Ludwig Grote,
by ― Attorney

No. 724,388. PATENTED MAR. 31, 1903.
L. GROTE.
MACHINE FOR MAKING GLASS BOTTLES.
APPLICATION FILED JUNE 29, 1901.
NO MODEL. 7 SHEETS—SHEET 5.
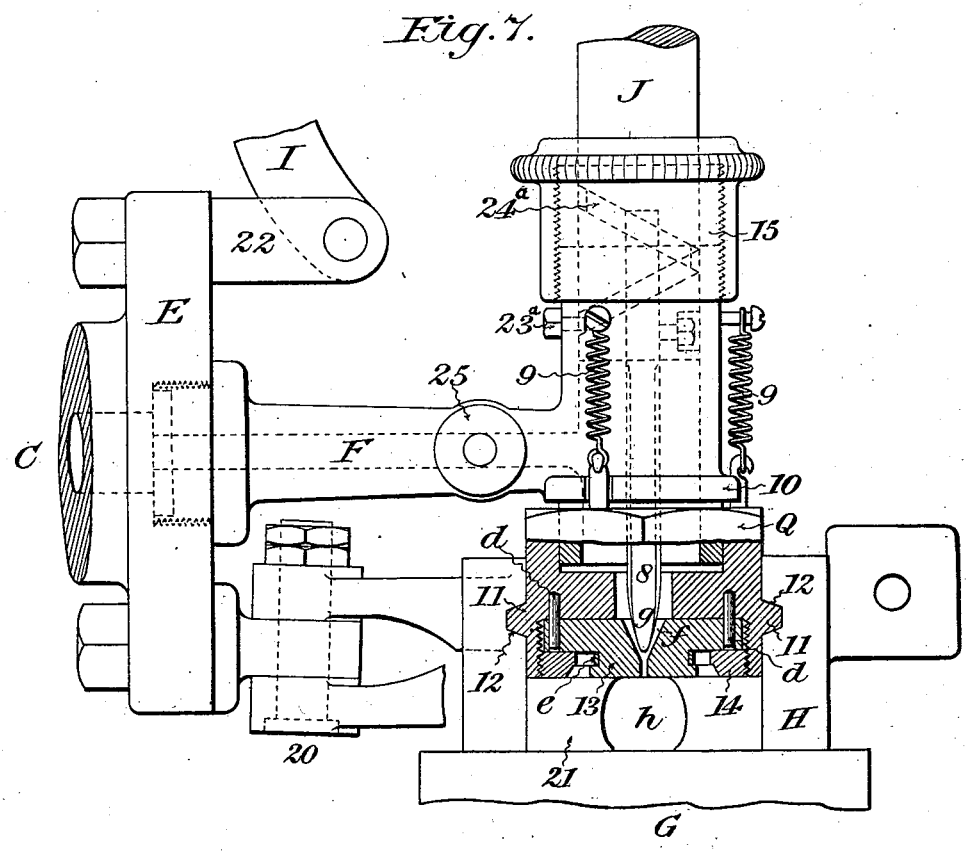
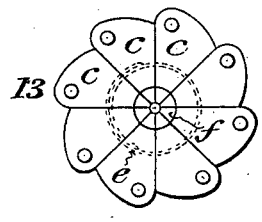
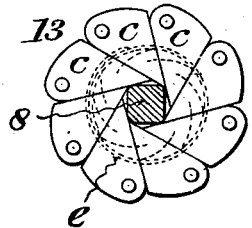

No. 724,388. PATENTED MAR. 31, 1903.
L. GROTE.
MACHINE FOR MAKING GLASS BOTTLES.
APPLICATION FILED JUNE 29, 1901.
NO MODEL. 7 SHEETS—SHEET 6.
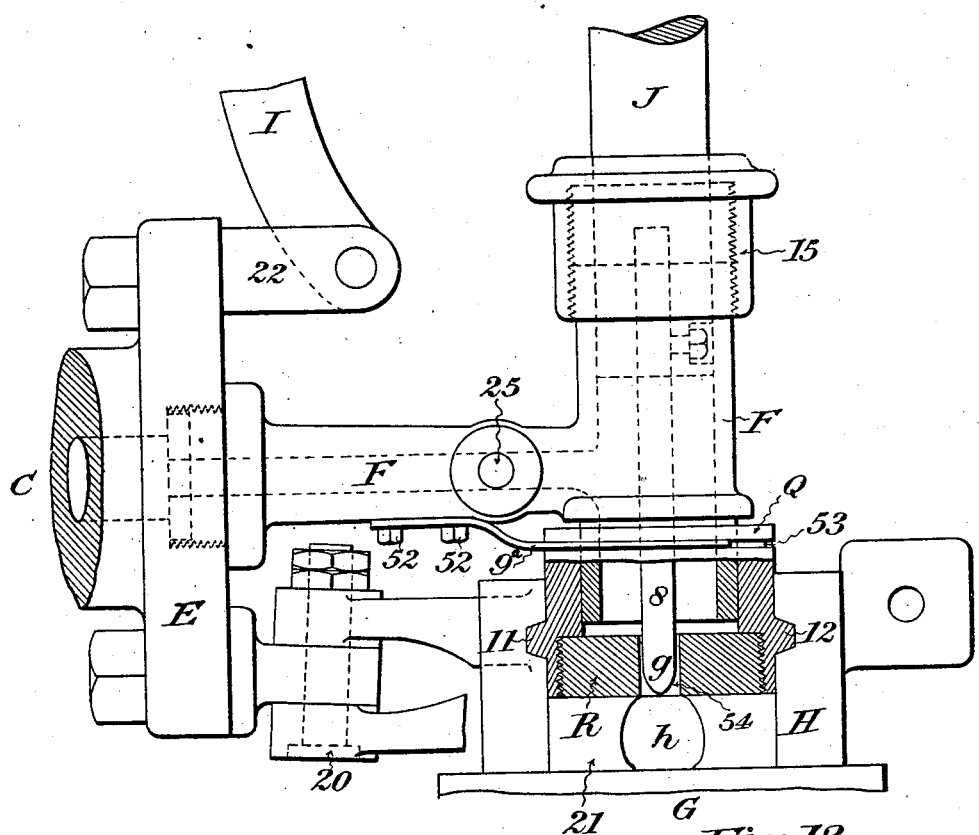
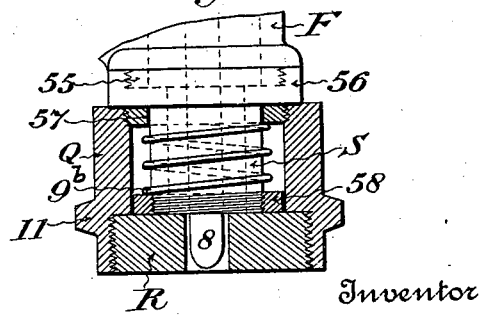
Witnesses
C. H. Walker.
E. Thos. Loftus.
Inventor
Ludwig Grote
by R. L. Ewin,
Attorney.

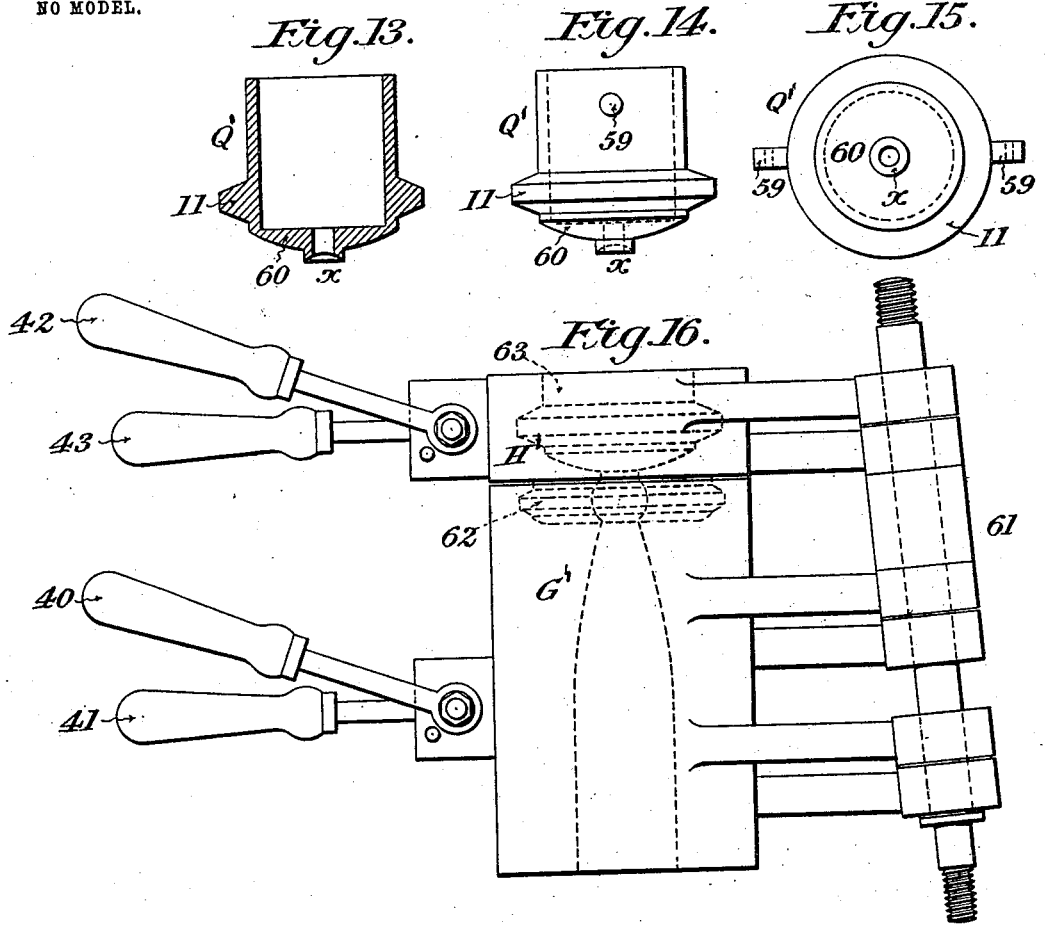

UNITED STATES PATENT OFFICE.

LUDWIG GROTE, OF LONDON, ENGLAND, ASSIGNOR TO GROTE BOTTLE MACHINE COMPANY, OF JERSEY CITY, NEW JERSEY, A CORPORATION OF NEW JERSEY.

MACHINE FOR MAKING GLASS BOTTLES.

SPECIFICATION forming part of Letters Patent No. 724,388, dated March 31, 1903.

Application filed June 29, 1901. Serial No. 66,588. (No model.)

*To all whom it may concern:*

Be it known that I, LUDWIG GROTE, a subject of the Emperor of Germany, residing at 84B East India Dock road, Poplar, London, England, have invented a new and useful Improvement in Machines for Making Glass Bottles, of which the following is a specification.

This invention relates, primarily, to improvements on the "pillar-machine" set forth in the specification forming part of my application for United States Letters Patent filed the 13th day of July, 1900, Serial No. 23,516; and it consists in certain novel combinations of parts hereinafter set forth and claimed.

The leading objects of the present invention are to facilitate quickly freeing the depending body of the parison or inchoate bottle from the parison-mold for the paddling and finishing operations, to facilitate moving two or more finishing-molds successively into and out of working position, and to more perfectly free or disengage the finished bottles by opening the neck-mold, and, more specifically with reference to the latter, to automatically disengage the nozzle of the air-conduit from the lip of the finished bottle when the neck-mold is opened.

Another object is to automatically clear the parts of the neck-mold from the matching-surfaces of the body-finishing mold when the neck-mold is opened.

Another object is to automatically render the opening in what is the bottom of the mold at the casting operation normally contracted above the tapered point of the plunger, so as to prevent the molten glass from penetrating said opening and to accommodate the latter to plungers of different sizes.

Another object is to adapt one and the same bottom part and one and the same pair of body-mold shells for employment in connection with interchangeable linings to form finishing-molds for bottles of different dimensions.

Another object is to so construct and insert such interchangeable linings of the body-finishing molds that their meeting edges shall be in different vertical planes with reference to the bisecting-joints of the body-mold shells or casings, so that when the molds are closed the linings will break joint with the shell parts, and thus prevent or lessen the possibility of the outside air entering through said joints and injuring the bottles while being blown in such molds.

Another object is to positively fasten the body and bottom finishing molds successively in working position by a detent common to both parts of each set.

Figure 2:
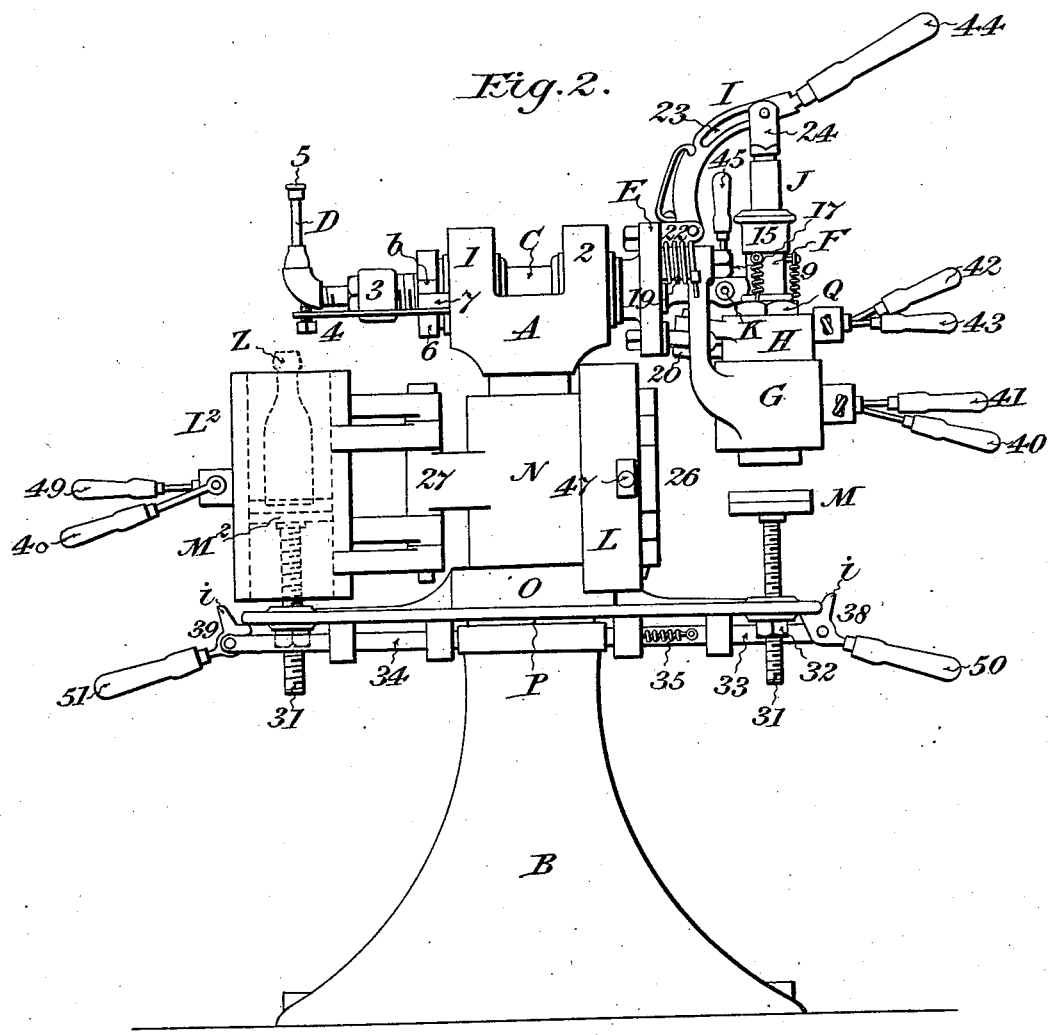
Figure 3:
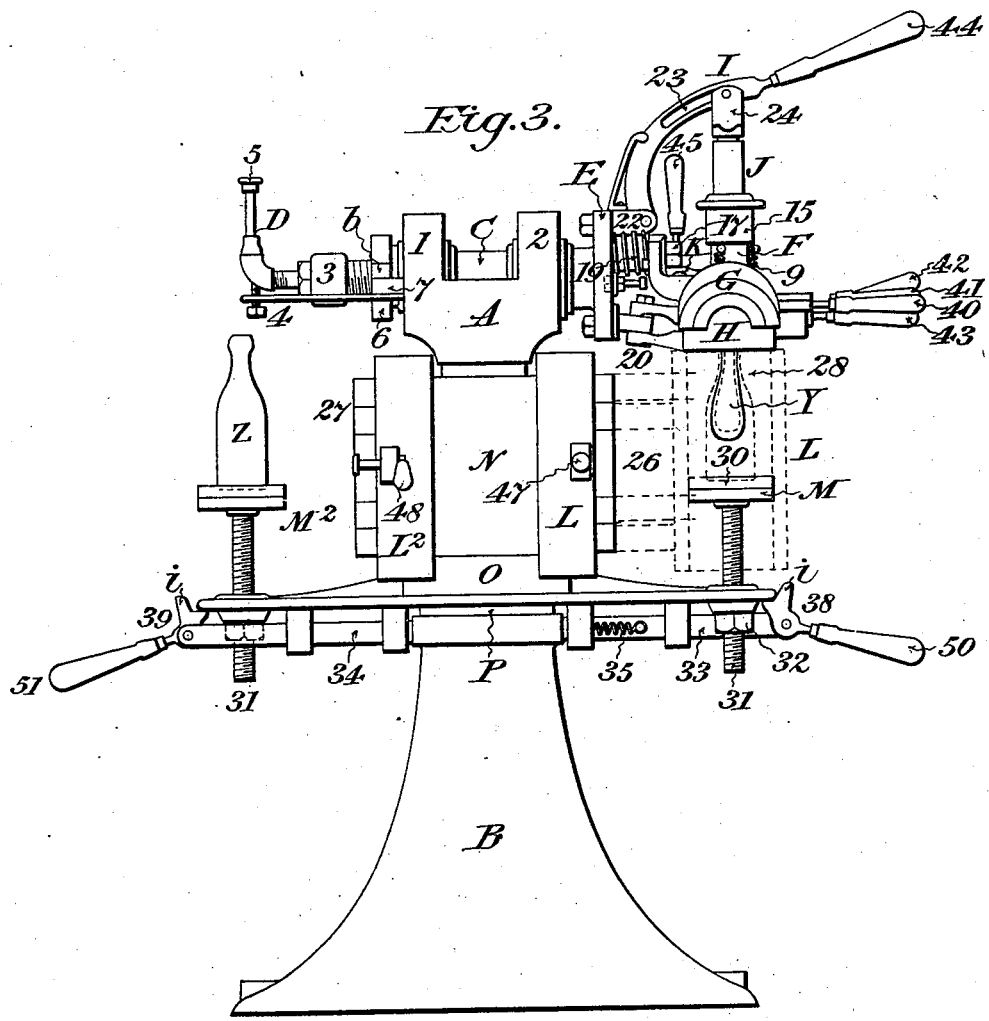
Figure 5:
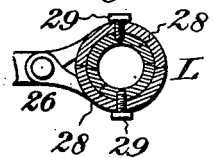
Figure 4:
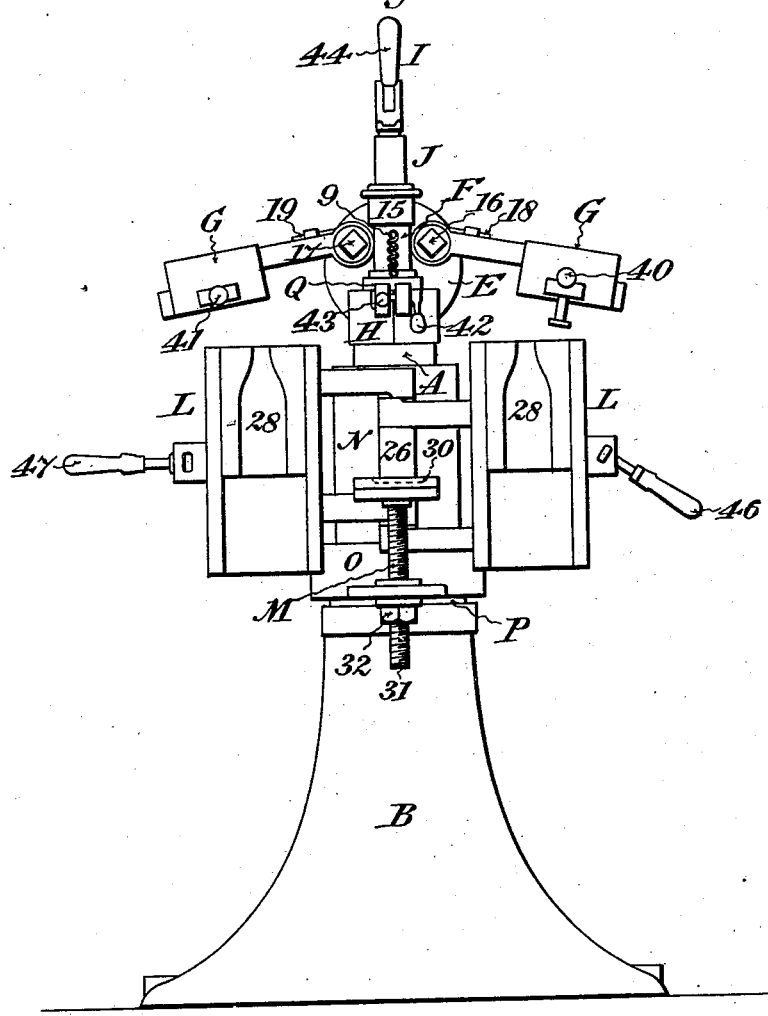
Figure 6:
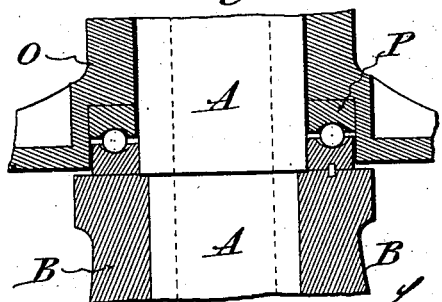

Seven sheets of drawings accompany this specification as part thereof. Figures 1, 2, and 3 of the drawings are elevations from one and the same standpoint, showing the movable parts in different positions. Fig. 4 is an elevation from another standpoint with the parts as in full lines in Fig. 3. Fig. 5 is a sectional plan view of one of the body-finishing molds. Fig. 6 is a magnified sectional detail of the pillar. Fig. 7 is an enlargement of a portion of Fig. 3, partly in section, showing details of said nozzle of the air-conduit. Figs. 8 and 9 are detail views of a diaphragm-shutter shown in section in Fig. 7. Fig. 10 is a fragmentary sectional elevation similar to Fig. 7, illustrating modifications. Fig. 11 is a plan view of the spring shown in Fig. 10. Fig. 12 is a sectional elevation illustrating another nozzle modification. Figs. 13, 14, and 15 are detail views of another modified nozzle. Fig. 16 is an elevation of a modified set of neck and parison molds, and Fig. 17 is a plan view of the modified neck-mold projected from Fig. 16.

Like letters and numbers refer to like parts in all the figures.

The improved machine (represented by Figs. 1 to 9, inclusive) in common with that set forth in said previous specification comprises a pillar A, supported in upright position by a base B and provided at top with horizontal bearings 1 and 2, the bore of which is perpendicular to the front of the machine; a short tube C, mounted in said bearings; an air-supply pipe D, attached to the rear end of said tube by a coupling 3; a face-plate E at the front end of said tube; a combined plunger-support and air-conduit F, communicating with the interior of the tube C and movable with said face-plate; a bisected parison-mold G and a bisected head-mold or "neck-mold" H, the parts of both of which are hinged to said face-plate; a hand-lever I, hinged to said face-plate, and a mouth-forming and air-admitting plunger J, actuated by said hand-lever and guided by said plunger-support and air-conduit F; an air-cock K, by which the blowing operation is controlled; finishing body-molds L and L², movable successively into alinement with the neck-mold H; bottom-molds M and M², completing the finishing-molds; a carrier N, embracing the pillar A and to which the halves of the casings or shells of said body-molds L and L² are hinged, and a support O for said bottom-molds M and M², turning around said pillar A. As in the previous machine, also, the molten glass is introduced at X, Fig. 1, with the parison-mold G at top, as in this figure, and the head of the bottle is cast within the neck-mold H at this operation. The plunger J is then reciprocated by means of the hand-lever I, and the blowing is commenced by manipulating the air-cock K. The parts movable with the face-plate F are then inverted, as in Fig. 2, while the gentle admission of air is continued. The parison-mold is then opened to expose the depending inchoate bottle or parison Y, as in Fig. 3. The parison thus exposed is paddled, and one of the finishing body-molds L is closed around the paddled parison, as represented by dotted lines in this figure. The blowing is then completed and the admission of air cut off. The neck-mold H is then opened, and the finishing-mold, inclosing the released bottle Z, is moved, by means of the support O, to the back of the machine, as in Fig. 1. There the partly-annealed bottle is exposed to the air by throwing open the finishing-mold, as at Z in Fig. 3, and the bottle is finally removed to the annealing-oven, the casting and blowing of another at the front of the machine being meanwhile proceeded with.

In the present machine the pillar A and its base B are preferably distinct iron castings, and a ball-bearing P, Fig. 6, is formed upon the top of the base B within a circumferential enlargement of the bore of the hub of the bottom-mold support O, whereby moving the heavy finishing-molds is greatly aided and facilitated. The pillar A is made tubular and extends downward within the base B, as in Fig. 6. The tube C turns in the bearings 1 and 2, and the air-supply pipe D is swiveled thereto at 3. Connections 4 with the pillar keep the pipe D stationary and adapt it to be coupled to a flexible hose at 5. A collar 6, having a pair of lugs a and b, is fast on the rear end of the tube, and fixed stops 7 on the back of the pillar coact with said lugs alternately to arrest the parts carried by the face-plate E in the two positions of each represented in Figs. 1 and 2, respectively. The face-plate E may in this arrangement be integral with the tube C.

The combined plunger-support and air-conduit F is conveniently attached at the center of the face-plate E, as in Fig. 7, and is substantially T-shaped, with its stem horizontal. At that end of the plunger-guiding portion corresponding with the point of the plunger-bit 8 the air-conduit F is provided with a molding collar or nozzle Q, movable endwise relatively thereto and normally retracted by springs 9. (See Fig. 7.) The nozzle Q slides lengthwise on the matching end of the conduit and is normally held against a collar 10 thereon. It is constructed with a circumferential projection 11, preferably beveled, as in Fig. 7, or of an equivalent shape, and the interior of the neck-mold H is provided with a matching groove 12. When the neck-mold is closed, the coaction of said projection 11 and groove 12 draws the nozzle away from the stop-collar 10, as in Fig. 7, and presses the end of the nozzle against the matching surface within the neck-mold, as in this figure. The lip of the bottle is consequently cast in close contact with the end of the nozzle. When the neck-mold is opened to release the finished bottle, the nozzle Q is also released and being retracted by the springs 9 clears the lip of the bottle. Said end of the nozzle against which the lip of the bottle is cast is recessed or counterbored and internally threaded, and within the same a diaphragm-shutter 13, Figs. 8 and 9, is arranged, as in Fig. 7, and held in place by a screw-ring 14. The shutter 13 is composed of horizontally-swinging sections c, Figs. 8 and 9, vertical pivots d, Fig. 7, and a ring-shaped contracting-spring e, Figs. 7 to 9. The latter coacts with shoulders on the several sections and renders the shutter normally contracted, as in Figs. 7 and 8. At the center of the closed shutter a conical depression f, Figs. 7 and 8, coacts with the tapered point g, Fig. 7, of the plunger-bit 8 to open the shutter when the plunger-bit is projected, as in Fig. 9. The shutter is closed or contracted, as in Figs. 7 and 8, when the molten glass is introduced at X, Fig. 1, and the head of the bottle is cast in contact with the end of the nozzle Q, formed in this instance by the shutter 13, the point of the plunger-bit 8 being located below the effective portion of the shutter at the casting operation. The other extremity of the air-conduit F is provided with a stuffing-box 15, through which the plunger J works air-tight. The respective parts of the bisected parison-mold G are hinged to said face-plate independently of each other by stud-bolts 16 and 17, Figs. 1 to 4, equidistant from the axis of the tube and parallel therewith, and springs 18 and 19, coiled around the sleeves of the respective hinge-bolts, tend to retract the mold parts into their elevated position, Figs. 3 and 4, and retain them in this position when they are thrown apart, thus facilitating the exposure of the depending parison, while the construction of the parts is materially simplified.

The respective parts of the bisected neck-mold H are hinged to the face-plate E by a hinge 20, formed at an oblique angle to the axis of the mold, so that when the mold is opened its parts will swing upward and away from the matching end surface of the closed finishing-mold then alined therewith, so as to clear the latter for the transfer of the bottle within the mold to its position of discharge at the back of the machine. The neck-mold is provided with the customary interchangeable linings 21, and the matrical cavity $h$, Fig. 7, within the latter is now preferably extended to the bottom of the mold, so as to avoid any mold-mark across the neck of the product.

The hand-lever I is hinged to the face-plate E by a short hinge 22 and is constructed with a longitudinal slot 23, which coacts with a cross-pin within a coupling 24, as heretofore.

In connection with the diaphragm-shutter 13 within the nozzle Q the bit 8 of the plunger J is preferably of the imperforate flat-sided construction represented in Figs. 7 and 9 and is rotated when it is thrust through the shutter into the glass, and when it is retracted, as set forth in my specification forming part of United States Patent No. 656,286, dated August 21, 1900, such rotation being effected by the coaction of a stud-screw $23^a$, Fig. 7, inserted through the wall of the conduit F at any convenient point, and a spiral groove $24^a$, Fig. 7, in the plunger J, the plunger being swiveled to said coupling 24, so as to rotate freely.

The air-cock K is conveniently located parallel to the face-plate E and may be of any known or improved construction. Its socket in the air-conduit F is shown at 25 in Fig. 7.

The parts of the bisected finishing body-molds L and $L^2$ are hinged in pairs to the carrier N by hinges 26 and 27, the axes of which are vertical and near the carrier. The molds have within each interchangeable linings 28, Figs. 4 and 5, bisected like their shells, but so inserted or fastened in place by their attaching-screws 29, Fig. 5, that the linings break joints with the shells, and thus resist the entrance of air through the longitudinal joints of the molds.

The finishing bottom-molds M and $M^2$ fit within the lower portions of the shells of the body-molds L and $L^2$, and each is provided with a changeable bottom piece 30, Fig. 4, having its matrical surface. The bottom-molds are connected with the revolving support O by vertical screw-stems 31, which conveniently screw into tapped holes in the support O, so that the bottom-molds may be quickly adjusted as to height, which is their only adjustment, by turning them around the axes of their screw-stems. Jam-nuts 32 secure the bottom-molds against accidental displacement.

The carrier N is a cylindrical sleeve, preferably separate from the support O, but resting on the hub of the latter and movable therewith, so that the one ball-bearing P serves for both.

The support O comprises, with its recessed hub already described, a pair of horizontal arms, which carry the respective bottom-molds M and $M^2$. The fact that the latter fit within the body-molds L and $L^2$ facilitates keeping these parts alined with each other and also facilitates moving them in common from the front of the machine to its back and from back to front. For alining the finishing-molds in succession with the neck-mold H a pair of locking devices 33 and 34 are carried by the support O. These devices, as shown in Figs. 1 to 3, are horizontal bolts sliding in hangers beneath the respective arms of the support, pressed inward by springs 35 36 and interlocking in succession with a socket 37, Fig. 1, in the front of the base B at top when the corresponding bottom-mold M is alined for the blowing operation. The corresponding body-mold L is then closed and is alined by its bottom-mold. Retracting devices 38 and 39 provide in succession for unlocking the support O preliminary to turning it around the pillar A to transpose the finishing-molds. In the specific arrangement such retracting devices consist of short levers pivoted to the outer ends of the respective locking-bolts and having thumb-like projections $i$ to coact with the adjacent ends of the support.

Handles of wood or the like are provided for manipulating the respective parts of the machine as follows, viz: handles 40 and 41 on the parison-mold G, 42 and 43 on the neck-mold H, 44 on the hand-lever I, 45 on the air-cock K, 46 and 47 on the finishing body-mold L, 48 and 49 on the finishing body-mold $L^2$, 50 and 51 on the respective retracting devices 38 and 39.

In the modified construction represented by Figs. 10 and 11 a single-blade spring $9^a$, Fig. 11, takes the place of the spiral retracting-springs 9, Figs. 1 to 4 and Fig. 7, being conveniently attached by screws 52 to the horizontal portion of the air-conduit F and the nozzle having a circumferential groove 53 or an equivalent collar to coact therewith. A one-part diaphragm is represented at R in Fig. 10 in place of the diaphragm-shutter 13 and screw-ring 14, a central orifice 54 of sufficient diameter being closed to a sufficient extent by the point $g$ of the plunger-bit 8. The plunger-bit 8 (shown in Fig. 10) is or may be round or of any desired shape in cross-section and non-rotary and its extremity $g$ of any preferred form.

In the modified construction represented by Fig. 12 the nozzle end of the air-conduit F terminates in a screw-threaded extremity 55, which is embraced by a screw-socket 56 at one end of an extension-tube S within the nozzle Q. The nozzle proper has a substantially cylindrical interior screw-threaded at both ends and provided at its end adjoining said socket 56 with a screw-ring 57, against which a spiral $9^b$ abuts, reacting against a collar 58, which is screwed on the opposite end of the extension-tube S. A one-part diaphragm R, similar to the form last described, Fig. 10, is represented in Fig. 12; but it will be understood that this end of the modified nozzle may be adapted to have the lip of the bottle cast in contact therewith in any approved way. The plunger-bit 8 (represented in Fig. 12) may also be identical with the form represented in Fig. 10 or of any approved form.

The modified nozzle Q' (represented by Figs. 13, 14, and 15) is of a one-part construction and is designed for use in connection with external retracting-springs of the form shown at 9 in Figs. 1 to 4 and in Fig. 7. The nozzle embraces and slides lengthwise on the matching end of the air-conduit F, Fig. 7, and is provided with a pair of perforated lugs 59 to coact with a pair of such springs. It has the same beveled circumferential projection 11 as the other forms, and its characteristic feature is a nearly-closed end 60, integral with the body of the nozzle and provided at its center with a lip-shaping nipple $x$, conveniently integral with said bottom.

The modified set of parison and neck molds shown at G' and H' in Figs. 16 and 17 differ mainly from those previously described in having an oblique hinge 61, common to the halves of both molds, so that both are opened and closed by one and the same round of movements, and rapid work on the part of the operative is thus promoted. The matching ends of the two molds are also thus and otherwise adapted to interlock with each other, as at 62 in Fig. 16. The modified neck-mold H', as shown, is fitted to the modified nozzle Q', Figs. 13 to 15, as indicated by dotted lines at 63 in Fig. 16; but it will be understood that the lined neck-mold first described may be internally shaped and proportioned to embrace and coact with either of said modified nozzles and that said modified set of molds, Figs. 16 and 17, may likewise be fitted for employment in connection with either form of nozzle.

Other like modifications will suggest themselves to those skilled in the art.

Having thus described said improvement, I claim as my invention and desire to patent under this specification—

1. A machine for making glass bottles having, in combination, a neck-mold, a series of finishing-molds movable horizontally in succession into alinement with said neck-mold and away therefrom and each comprising a longitudinally-bisected body-mold and a bottom-mold the former inclosing the latter when the molds are closed, a vertical pillar around which said finishing-molds are movable, a carrier embracing said pillar to which the halves of said body-molds are hinged, a support movable around said pillar and carrying said bottom-molds, and a roller-bearing common to said carrier and said support.

2. A machine for making glass bottles having, in combination, a neck-mold, a nozzle movable lengthwise within said neck-mold and interlocked therewith when the neck-mold is closed, and means for retracting said nozzle when the neck-mold is opened.

3. A machine for making glass bottles having, in combination, a neck-mold, a nozzle movable lengthwise within said neck-mold, means carried by said neck-mold and nozzle for moving said nozzle into effective position when the neck-mold is closed, and means for retracting said nozzle when the neck-mold is opened.

4. A machine for making glass bottles having, in combination, a neck-mold, a spring-retracted nozzle movable lengthwise within said neck-mold, and means carried by said neck-mold and nozzle for moving said nozzle into effective position when the neck-mold is closed.

5. A machine for making glass bottles having, in combination, a neck-mold and a nozzle movable lengthwise within said neck-mold, said nozzle and said neck-mold having respectively a projection and a recess matching said projection for moving said nozzle into effective position when the neck-mold is closed.

6. A machine for making glass bottles having, in combination, a neck-mold and a nozzle movable lengthwise within said neck-mold, constructed respectively with a beveled circumferential projection and a matching groove for moving said nozzle into effective position when the neck-mold is closed.

7. A machine for making glass bottles having, in combination, a neck-mold and a nozzle movable lengthwise within said neck-mold, constructed respectively with a beveled circumferential projection and a matching groove for moving said nozzle into effective position when the neck-mold is closed, and a spring device for automatically retracting said nozzle when the neck-mold is opened.

8. A machine for making glass bottles having, in combination, a neck-mold longitudinally bisected and having an oblique hinge on which it opens and closes, and a finishing-mold adapted to be alined with said neck-mold and movable in a horizontal plane when cleared by the obliquely-moving halves of the neck-mold.

9. A machine for making glass bottles having, in combination, an air-conduit, a plunger movable endwise within said conduit and having a tapered end which it is adapted to protrude, a nozzle through which said tapered end projects, and a normally-contracted diaphragm-shutter within said nozzle adapted to be opened by said tapered end.

10. A machine for making glass bottles having, in combination, an air-conduit, a plunger movable endwise within said conduit and having a tapered end which it is adapted to protrude, a nozzle through which said tapered end projects, and a diaphragm-shutter comprising swinging sections and a ring-shaped spring common to all the sections for retracting the same to contract the orifice, and adapted to be opened by said tapered end.

11. A machine for making glass bottles having, in combination, a neck-mold, a series of finishing-molds movable horizontally in succession into alinement with said neck-mold and away therefrom and each comprising a longitudinally-bisected body-mold and a vertically-adjustable bottom-mold, the former inclosing the latter when the molds are closed, and a longitudinally-bisected lining extending upward from the permanent part of the bottom-mold.

12. A machine for making glass bottles having, in combination, a longitudinally-bisected neck-mold, a finishing body-mold adapted to be alined with said neck-mold and comprising a longitudinally-bisected shell, a longitudinally-bisected lining for the upper part of said shell breaking joints with said shell, and a vertically-adjustable bottom-mold fitting within the lower part of said shell and provided with a lining-piece at top having its matrical surface.

13. A machine for making glass bottles having, in combination, a neck-mold at the front of the machine, a series of finishing-molds adapted to be alined in succession with said neck-mold and each comprising a body-mold and a bottom-mold, a vertical pillar around which said finishing-molds are movable, a carrier surrounding said pillar and to which said body-molds are hinged, a subjacent support movable around said pillar and carrying said bottom-molds, and means for fastening said support at the front of the machine and thereby alining each finishing-mold in succession, substantially as hereinbefore specified.

LUDWIG GROTE.

Witnesses:
LESLIE LOCKHART,
WILLIAM J. HARVEY.